US007471844B2

(12) United States Patent
Tadas (10) Patent No.: US 7,471,844 B2
(45) Date of Patent: Dec. 30, 2008

(54) METHOD, APPARATUS AND SYSTEM FOR MULTI-FEATURE PROGRAMMABLE TAP FILTER IMAGE PROCESSING

(75) Inventor: Shashikiran H. Tadas, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 627 days.

(21) Appl. No.: 11/023,802

(22) Filed: Dec. 27, 2004

(65) Prior Publication Data

US 2006/0140501 A1    Jun. 29, 2006

(51) Int. Cl.
G06K 9/40      (2006.01)
(52) U.S. Cl. ...................................... 382/260
(58) Field of Classification Search ................ 348/273, 348/348, 663–670; 358/3.04, 3.26–3.27; 359/3.08, 339, 359, 498, 559–561; 353/84; 382/208, 210, 260–265, 254, 275; 725/127, 725/128, 149; 708/300–323; 375/240.29
See application file for complete search history.

(56) References Cited

U.S. PATENT DOCUMENTS

| | | | |
|---|---|---|---|
| 4,979,136 A | | 12/1990 | Weiman et al. |
| 5,260,888 A | * | 11/1993 | Sharman .................... 708/308 |
| 5,355,328 A | * | 10/1994 | Arbeiter et al. ............ 708/313 |
| 5,473,389 A | * | 12/1995 | Eto et al. ................... 348/669 |
| 5,555,515 A | * | 9/1996 | Tomita et al. .............. 708/300 |
| 5,961,461 A | | 10/1999 | Mo et al. |
| 6,483,951 B1 | | 11/2002 | Mendenhall et al. |
| 6,556,193 B1 | | 4/2003 | Auld et al. |
| 7,151,574 B2 | * | 12/2006 | Dong et al. ................ 348/663 |
| 2002/0019892 A1 | * | 2/2002 | Kondo et al. ................ 710/62 |
| 2004/0062316 A1 | * | 4/2004 | Xiong et al. ........... 375/240.29 |
| 2004/0264797 A1 | | 12/2004 | Lippencott |
| 2005/0018929 A1 | | 1/2005 | Lippencott |

FOREIGN PATENT DOCUMENTS

EP       0 633 535 A1     1/1995

OTHER PUBLICATIONS

U.S. Appl. No. 10/876,235, filed Jun. 24, 2004; Inventor: Kalpesh Mehta.
U.S. Appl. No. 10/882,457, filed Jun. 30, 2004; Inventor: Louis Lippencott.

* cited by examiner

Primary Examiner—Sherali Ishrat
(74) Attorney, Agent, or Firm—Trop, Pruner & Hu, P.C.

(57) ABSTRACT

Apparatus, systems and methods for providing a multi-feature, programmable tap filter architecture for image processing are disclosed. In one implementation, a system includes an image data source for providing image pixel data, an image filtering coefficient source for providing a plurality of image filtering coefficient sets, and image processing logic capable of at least filtering the image pixel data using one or more image filtering coefficient sets specified by one or more indicators. The processing logic being also capable of blending adjacent and/or non-adjacent tap filter outputs to generate blended tap filter outputs.

14 Claims, 7 Drawing Sheets

| 1,1 | 2,1 | 3,1 | 4,1 | 5,1 | 6,1 | 7,1 | 8,1 | 9,1 | 10,1 | 11,1 |
|---|---|---|---|---|---|---|---|---|---|---|
| 1,2 | 2,2 | 3,2 | 4,2 | 5,2 | 6,2 | 7,2 | 8,2 | 9,2 | 10,2 | 11,2 |
| 1,3 | 2,3 | 3,3 | 4,3 | 5,3 | 6,3 | 7,3 | 8,3 | 9,3 | 10,3 | 11,3 |
| 1,4 | 2,4 | 3,4 | 4,4 | 5,4 | 6,4 | 7,4 | 8,4 | 9,4 | 10,4 | 11,4 |
| 1,5 | 2,5 | 3,5 | 4,5 | 5,5 | 6,5 | 7,5 | 8,5 | 9,5 | 10,5 | 11,5 |
| 1,6 | 2,6 | 3,6 | 4,6 | 5,6 | 6,6 | 7,6 | 8,6 | 9,6 | 10,6 | 11,6 |
| 1,7 | 2,7 | 3,7 | 4,7 | 5,7 | 6,7 | 7,7 | 8,7 | 9,7 | 10,7 | 11,7 |
| 1,8 | 2,8 | 3,8 | 4,8 | 5,8 | 6,8 | 7,8 | 8,8 | 9,8 | 10,8 | 11,8 |
| 1,9 | 2,9 | 3,9 | 4,9 | 5,9 | 6,9 | 7,9 | 8,9 | 9,9 | 10,9 | 11,9 |
| 1,10 | 2,10 | 3,10 | 4,10 | 5,10 | 6,10 | 7,10 | 8,10 | 9,10 | 10,10 | 11,10 |
| 1,11 | 2,11 | 3,11 | 4,11 | 5,11 | 6,11 | 7,11 | 8,11 | 9,11 | 10,11 | 11,11 |

| 1,1 | 2,1 | 3,1 | 4,1 | 5,1 | 6,1 | 5,1 | 4,1 | 3,1 | 2,1 | 1,1 |
|---|---|---|---|---|---|---|---|---|---|---|
| 1,2 | 2,2 | 3,2 | 4,2 | 5,2 | 6,2 | 5,2 | 4,2 | 3,2 | 2,2 | 1,2 |
| 1,3 | 2,3 | 3,3 | 4,3 | 5,3 | 6,3 | 5,3 | 4,3 | 3,3 | 2,3 | 1,3 |
| 1,4 | 2,4 | 3,4 | 4,4 | 5,4 | 6,4 | 5,4 | 4,4 | 3,4 | 2,4 | 1,4 |
| 1,5 | 2,5 | 3,5 | 4,5 | 5,5 | 6,5 | 5,5 | 4,5 | 3,5 | 2,5 | 1,5 |
| 1,6 | 2,6 | 3,6 | 4,6 | 5,6 | 6,6 | 5,6 | 4,6 | 3,6 | 2,6 | 1,6 |
| 1,5 | 2,5 | 3,5 | 4,5 | 5,5 | 6,5 | 5,5 | 4,5 | 3,5 | 2,5 | 1,5 |
| 1,4 | 2,4 | 3,4 | 4,4 | 5,4 | 6,4 | 5,4 | 4,4 | 3,4 | 2,4 | 1,4 |
| 1,3 | 2,3 | 3,3 | 4,3 | 5,3 | 6,3 | 5,3 | 4,3 | 3,3 | 2,3 | 1,3 |
| 1,2 | 2,2 | 3,2 | 4,2 | 5,2 | 6,2 | 5,2 | 4,2 | 3,2 | 2,2 | 1,2 |
| 1,1 | 2,1 | 3,1 | 4,1 | 5,1 | 6,1 | 5,1 | 4,1 | 3,1 | 2,1 | 1,1 |

METHOD, APPARATUS AND SYSTEM FOR MULTI-FEATURE PROGRAMMABLE TAP FILTER IMAGE PROCESSING

BACKGROUND

Image processing has traditionally been undertaken using either devices designed specifically to provide image processing (e.g., application specific integrated circuits (ASICs)) or more general purpose devices (e.g., digital signal processors (DSPs)) where the image processing has been adapted to match existing device functionality. Although ASICs may provide specific functionality they are also costly to design, have long development cycles and tend to be inflexible. While DSPs may, on the other hand, be more flexible than ASICs they are also more difficult to optimize for image processing.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings.

FIGS. 9 A,B illustrate example coefficients sets.

DETAILED DESCRIPTION

The following detailed description refers to the accompanying drawings. The same reference numbers may be used in different drawings to identify the same or similar elements. In the following description specific details are set forth such as particular structures, architectures, interfaces, techniques, etc. in order to provide a thorough understanding of the various aspects of the claimed invention. However, such details are provided for purposes of explanation and should not be viewed as limiting. Moreover, it will be apparent to those skilled in the art, having the benefit of the present disclosure, that the various aspects of the invention claimed may be practiced in other examples that depart from these specific details. In certain instances, descriptions of well known devices, circuits, and methods are omitted so as not to obscure the description of the present invention with unnecessary detail.

Figure 1:
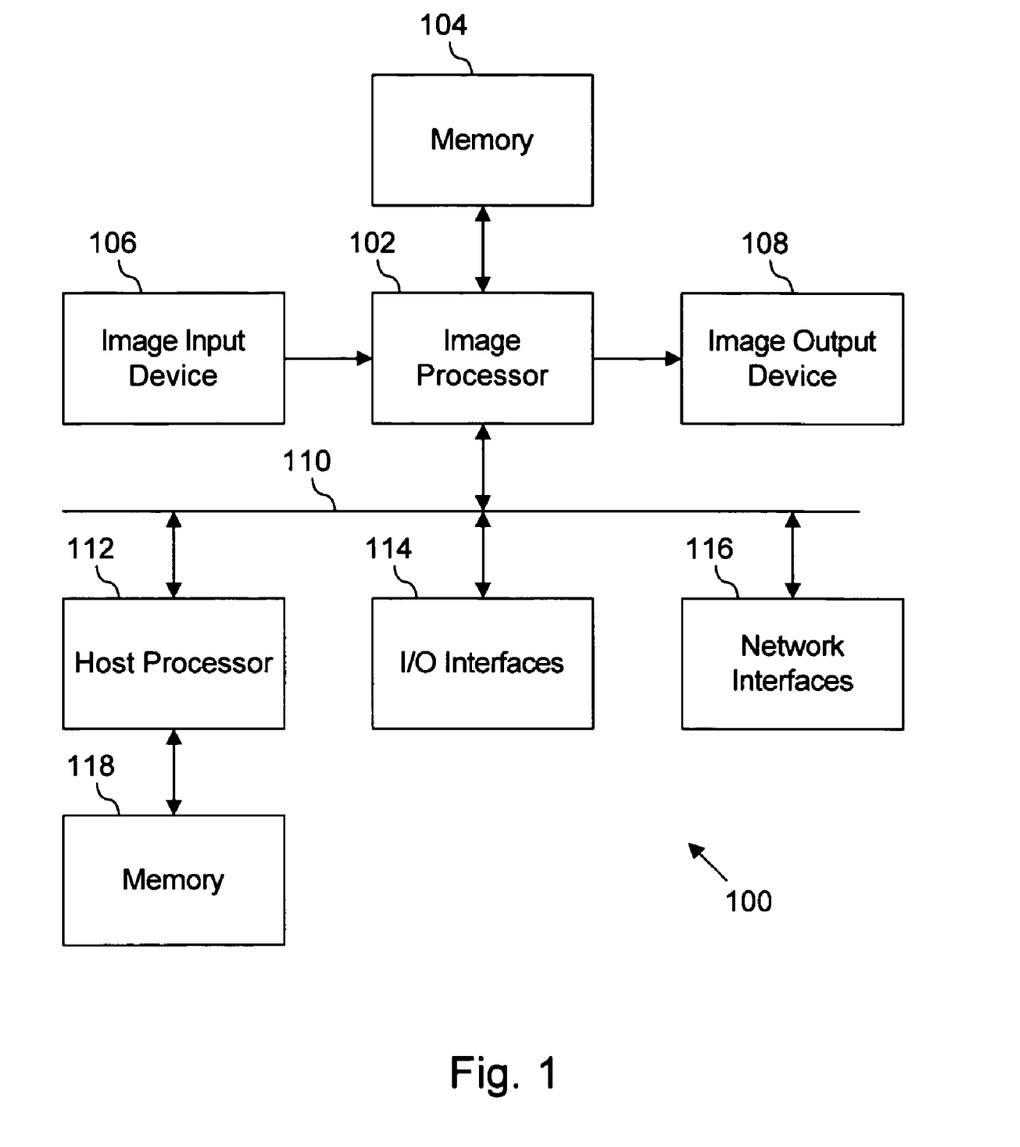
FIG. 1 illustrates an example image processing system.

FIG. 1 illustrates an example system 100 according to one implementation of the invention. System 100 may include one or more image processors (IP) 102, memory 104, one or more image input devices 106, and one or more image output devices 108. In addition, in one implementation, IP 102 may communicate over a shared bus 110 or other communication mechanism with a host processor 112, one or more input/output (I/O) interfaces 114 (e.g., universal synchronous bus (USB) interfaces, parallel ports, serial ports, telephone ports, and/or other I/O interfaces), and/or one or more network interfaces 116 (e.g., wired and/or wireless local area network (LAN) and/or wide area network (WAN) and/or personal area network (PAN), and/or other wired and/or wireless network interfaces). Host processor 112 may also communicate with one or more memory devices 118.

Image processor 102 may include one or more devices capable of performing one or more image processing functions. In one implementation, image processor 102 may receive image data (e.g., in the form of image pixel data) from memory 104 and/or from image input device 106. In one implementation, image processor 102 may provide a programmable tap filter architecture for image processing, that may filter pixel data in response to indicators and/or indicator data associated with the pixel data. In one implementation, IP 102 may filter pixel data in response to indicator data and/or input data associated and/or appended to one or more portions of pixel data. In other implementations, IP 102 may filter pixel data in response to indicators and/or static data stored and/or located in, for example, one or more registers and/or files. Image processor 102 may output the filtered image data to memory 104 and/or image output device 108.

Memory 104 and/or memory 118 may be any device and/or mechanism capable of storing and/or holding image data, pixel data (i.e., possibly including input data) and/or indicator data, to name a few examples. For example, although the invention is not limited in this regard, memory 104 may be static random access memory (SRAM). For example, although the invention is not limited in this regard, memory 118 may be dynamic random access memory (DRAM).

Image input device(s) 106 may include any of a number of mechanisms and/or device(s) suitable for capturing image data. For example, although the invention is not limited in this regard, an image input device 106 may include a sensor array (e.g., a CMOS/CCD sensor array), and/or another type of image capture mechanism. Image output device(s) 108 may include any of a number of mechanisms and/or device(s) that consume and/or display image data. For example, although the invention is not limited in this regard, image output device 108 may include a printer, computer monitor and/or other type of image display or output mechanism.

Host processor 112 may be, in various implementations, a special purpose or a general purpose processor. Further, host processor 112 may comprise a single device (e.g., a microprocessor or ASIC) or multiple devices. In one implementation, host processor 112 may be capable of performing any of a number of tasks that support image processing. These tasks may include, for example, although the invention is not limited in this regard, providing image filtering coefficients to IP 102, downloading microcode to IP 102, initializing and/or configuring registers within IP 102, interrupt servicing, and providing a bus interface for uploading and/or downloading image data. In alternate implementations, some or all of these functions may be performed by IP 102.

Figure 2:
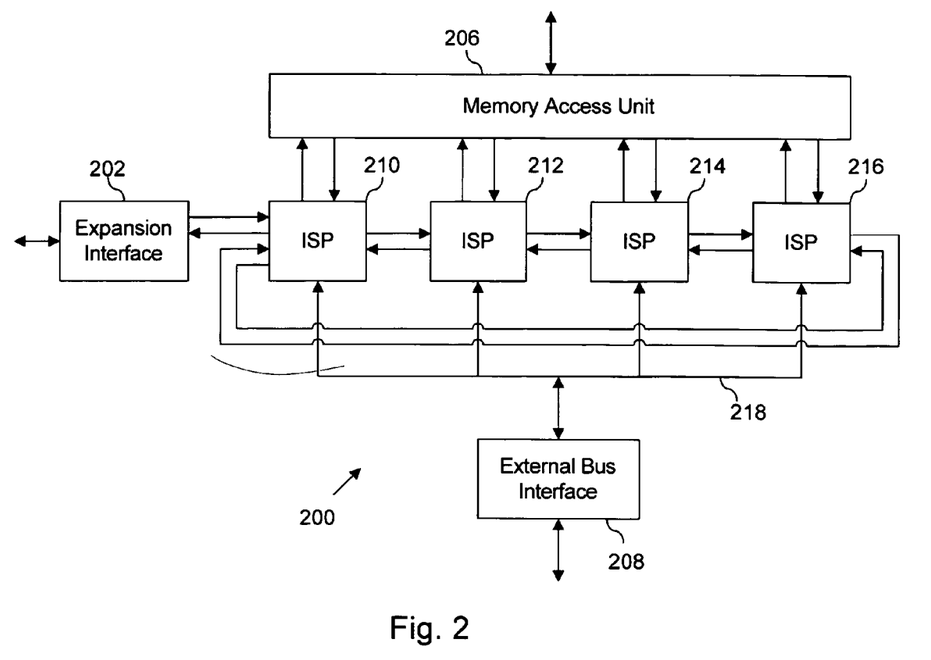
FIG. 2 illustrates the image processor of the system of FIG. 1 in more detail.

FIG. 2 is a simplified block diagram of an image processing device 200 (e.g., image processor 102, FIG. 1), in accordance with an implementation of the invention. Image processing device 200 may include one or more expansion interfaces 202, one or more memory access units 206, one or more external bus interfaces 208, and one or more image signal processors (ISPs) 210, 212, 214, 216.

In one implementation, expansion interfaces 202 may enable image processing device 200 to be connected to other devices and/or integrated circuits (ICs) within a system (e.g., image input device 106 and/or image output device 108, FIG. 1). Each expansion interface 202 may be programmable to accommodate the device to which it is connected. In one implementation, each expansion interface 202 may include a parallel I/O interface (e.g., an 8-bit, 16-bit or other interface), and the expansion interfaces 202 may use the parallel I/O interface to simultaneously transfer data, such as image pixel data, into and/or out of device 200.

Memory access unit 206 may enable data to be stored within and/or retrieved from an external memory device (e.g., memory 104, FIG. 1). However, the invention is not limited in this regard, and, for example, device 200 may include internal memory (not shown) for storing and/or holding data such as image pixel data. In one implementation, memory access unit 206 may support a parallel (e.g., 8-bit, 16-bit or other) interface.

External bus interface 208 may enable device 200 to connect to an external bus (e.g., bus 110, FIG. 1). In one implementation, bus interface 208 may enable device 200 to receive image filter coefficients, microcode, configuration information, debug information, and/or other information or data from an external host processor (e.g., processor 112, FIG. 1), and to provide that information to ISPs 210, 212, 214, 216 via a global bus 218.

Image data may be processed by one or more of ISPs 210-216. In one implementation, ISPs 210-216 may be interconnected in a mesh-type configuration, although the invention is not limited in this regard. ISPs 210-216 may process data in parallel and/or in series, and each ISP 210-216 may perform the same or different functions. Further, ISPs 210-216 may have identical or different architectures. Although four ISPs 210-216 are illustrated, in other implementations device 200 may have more or fewer ISPs than ISPs 210-216.

In one implementation, at least one ISP 210-216 is capable of executing a programmable tap filter architecture for image processing. More particularly, at least one ISP 210-216 may implement a programmable tap filter architecture for image processing, where coefficient sets may be selected and/or reconfigured any number of times. In one implementation, coefficient sets may be selected in response to reconfigurable data and/or indicators. Moreover, in one implementation, coefficient sets may be selected and/or reconfigured in response to indicator data associated with the image data being processed by the programmable tap filter architecture.

Further, at least one ISP 210-216 may be configured to selectively perform any of a number of different types of coefficient filters, including but not limited to 1-D, 2-D separable, and/or 2-D non-separable filters. Methods and apparatus for implementing each of these filter types will be described in more detail later.

In one implementation, the number of filter taps may also be configured. For example, but not by way of limitation, one or more of ISPs 210-216 may be configured to perform a two-dimensional 3×3 (F3), 5×5 (F5), 7×7 (F7), 9×9 (F9), or 11×11 (F11) filter, or a filter having another number of taps, such as a blended tap output generated by combining two or more tap outputs. In one implementation, one or more of ISPs 210-216 may be configured to perform more than one two-dimensional filter at a time, or to provide a filter architecture having a blended tap output (e.g., a 3×3 (F3) tap output blended with a 5×5 (F5) tap output to generate a 4×4 (F4) tap output). Below, example implementations are described for implementing an F11 filter. It is to be understood, however, that this is for illustration purposes only, and that filters with other numbers of taps also may be implemented in accordance with the invention.

Further, in one implementation, the format of input data supplied to one or more of ISPs 210-216 may be configurable. Image data may come in any of a number of forms, but generally each data value represents a pixel intensity. Pixel data may come in the form of "single component" (e.g., LLL) values, three-component sampled (e.g., red/green/blue or RGB) values, and/or three-component, sub-sampled (e.g., LaLb) values, to name several well-known formats. Further, the input data may be input in a single-column or multiple-column format (e.g., three-component, sub-sampled, four column LaLb), and the swath height (i.e., the number of pixel rows in a processing block) also may vary. In one embodiment, the column format and the swath height also may be configurable. The invention is, however, not limited to a particular pixel data format.

Figure 3:
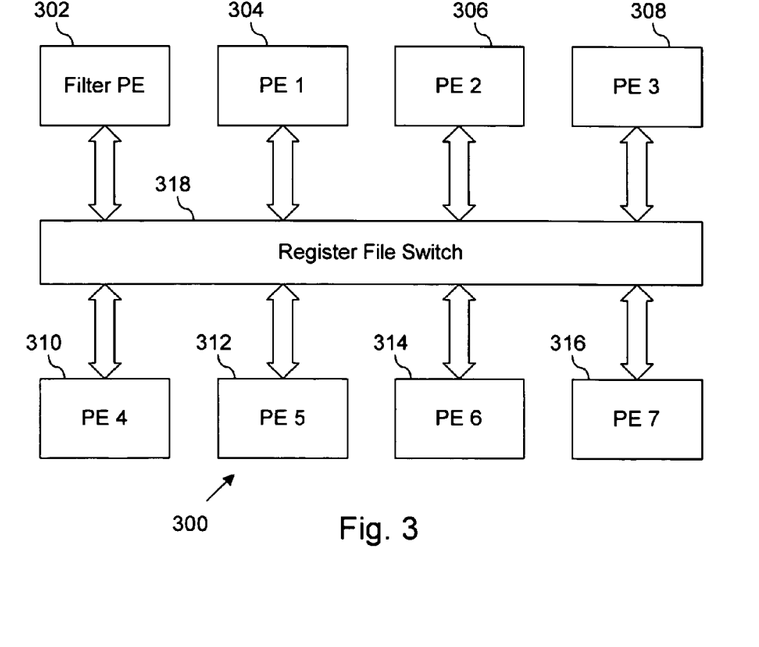
FIG. 3 illustrates an image signal processor of the image processor of FIG. 2 in more detail.

FIG. 3 is a simplified block diagram of an ISP (e.g., ISP 210, FIG. 2), in accordance with the invention. In one implementation, ISP 300 includes processing elements (PEs) 302-316, and a register file switch 318. In one implementation, at least one PE is a filter PE, which filters pixel data according to an implementation of the invention. For example, PE 302 is illustrated as a filter PE.

One or more of PEs 302-316 may be micro-engines, which may be programmed using micro-code, in one implementation, provided, for example, by host processor 112 (FIG. 1). Accordingly, one or more of PEs 302-316 may perform substantially the same and/or substantially different operations. Although eight PEs 302-316 are illustrated in FIG. 3, the invention is not limited in this regard and more or fewer PEs may be associated with an ISP. In one implementation, register file switch 318 may include a cross-bar switch. Accordingly, register file switch 318 may include communication registers useful for communicating information and/or data such as pixel data and/or filter coefficients between PEs 302-316.

Figure 4:
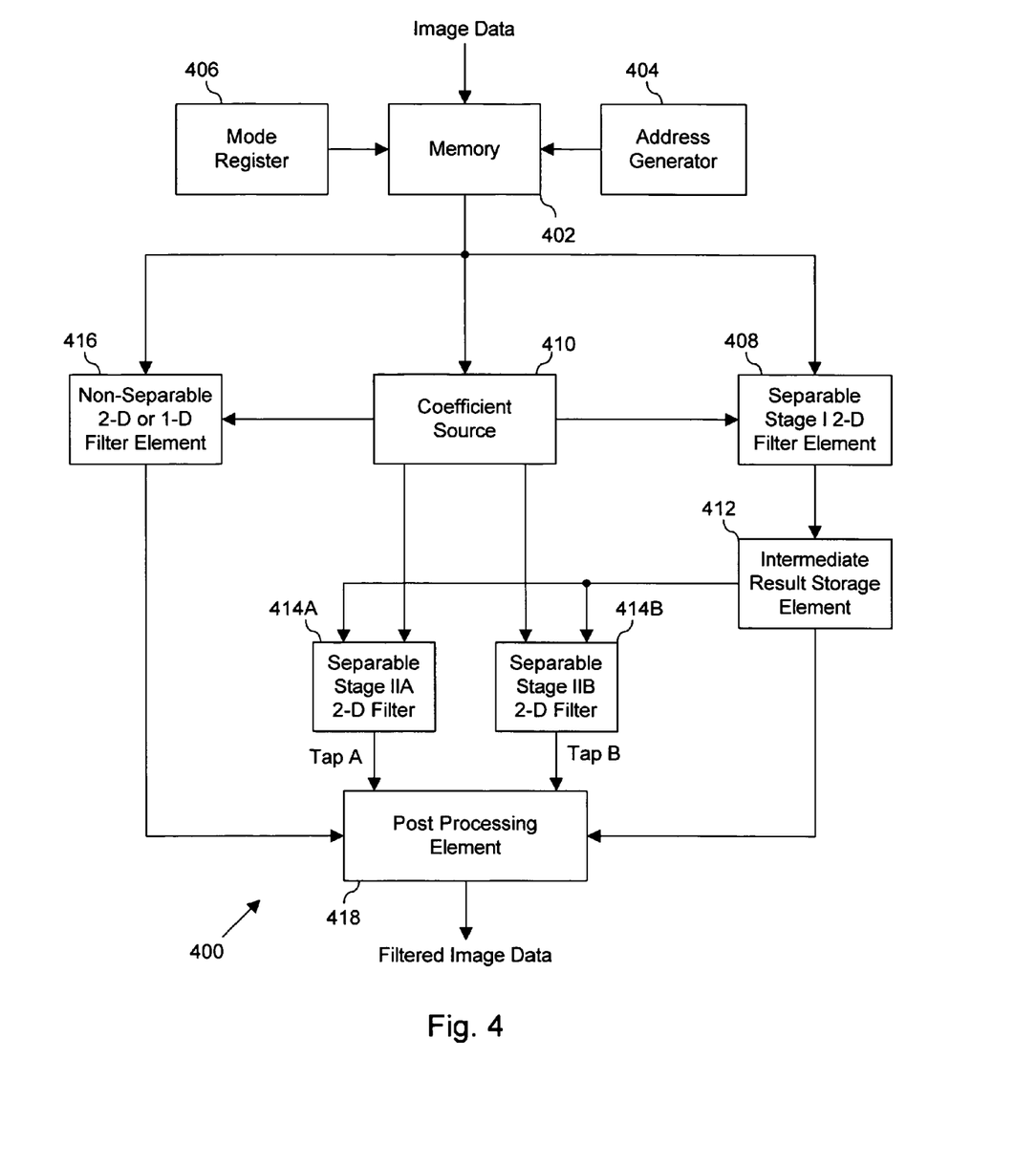
FIG. 4 illustrates a portion of the image signal processor of FIG. 3 in more detail.

FIG. 4 is a simplified block diagram of a filter PE (e.g., filter PE 302, FIG. 3), in accordance with the invention. Filter PE 400 may include a memory 402, an address generator 404, a mode register 406, a separable stage I filter element 408, a coefficient source 410, an intermediate result storage element 412, separable stage II filter elements 414A and 414B, a non-separable filter element 416, and a post-processing element 418.

Memory 402 may be any mechanism and/or device(s) capable of holding and/or storing data, such as image pixel data. For example, memory 402 may be SRAM. All or a portion of a processing block of image data, in the form of digitized pixel intensity information, may be initially stored in memory 402. In one implementation, the image data may be received from an external memory interface (e.g., access unit 206, FIG. 2) and/or an expansion interface (e.g., interface 202, FIG. 2) and/or a bus interface (e.g., interface 208, FIG. 2). In one implementation, the image data may be stored in memory 402 in a column-wise fashion.

In one implementation, intermediate result storage element 412 may include one or more registers for storing intermediate filtered data generated by separable stage I filter element 408. However, the invention is not limited in this regard and intermediate result storage element 412 may comprise any suitable means for temporarily holding and/or storing intermediate filter results. For example, storage element 412 could include any combination of storage devices such as RAM and/or non-volatile memory.

As discussed previously, a filter implemented using filter PE 400 may be configurable in any one of a number of ways. In one implementation, filter PE 400 may have a configuration specified in response to configuration information stored within mode register 406. In one implementation, filter PE 400 may have a configuration specified, at least in part, in response to configuration information associated with image pixel data.

Figure 5A:
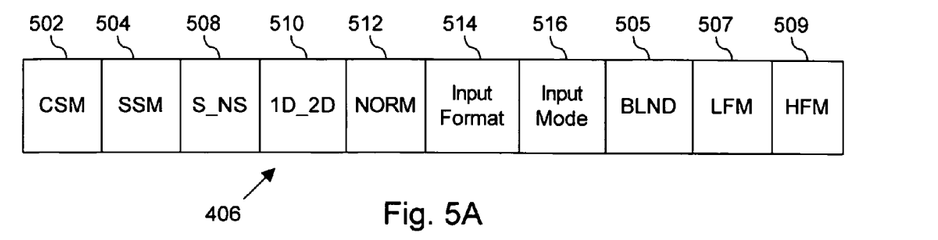
FIGS. 5A,B illustrate, respectively, example fields for the mode register of FIG. 4 and example data configurations.

FIG. 5A is a diagram illustrating an implementation of mode register 406 in more detail, in accordance with the invention. Mode register 406 may include a number of fields, such as a Coefficient Switching Mode (CSM) field 502, a Static Switching Mode (SSM) field 504, a separable/non-separable (S_NS) field 508, a 1-D_2-D field 510, a normalization selector field (NORM) 512, an input format field 514, an input mode field 516, a blending field (BLND) 505, a low filter mode (LFM) field 507, and a high filter mode (HFM) field 509.

Figure 5B:
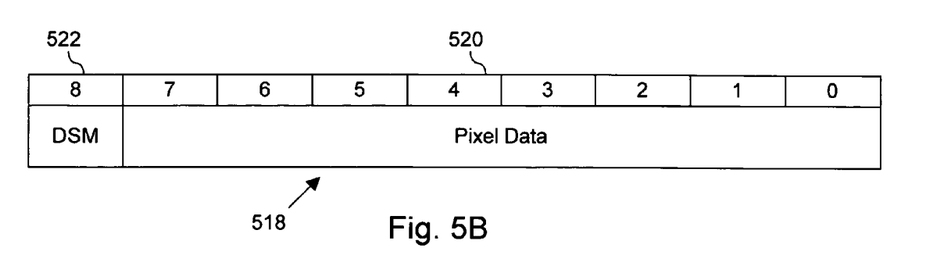

FIG. 5B is a diagram illustrating a format of pixel input data 518, in accordance with an implementation of the inventive subject matter. Input data 518 may include a number of data bits (in this example the lower eight bits 520 of the input data 518) specifying pixel intensity (e.g., 8-bit red luminance component intensity of a 3-component, sub-sampled LaLb pixel) as well as one or more Dynamic Switching Mode (DSM) data bits 522.

Referring to FIGS. 5A and 5B, the S_NS field 508 may indicate whether a separable filter or a non-separable filter is to be implemented, as will be described in more detail below. This field may be relevant for 2-D filters, in particular. In one implementation, the 1-D_2-D field 510 may indicate whether a 1-D or a 2-D filter is being implemented. As will be described in more detail later, a 1-D filter may implement filtering in the horizontal dimension only, whereas a 2-D filter may implement filtering in both the horizontal and vertical dimensions. In one implementation, NORM field 512 may indicate whether the output of the filtering process should be normalized or not. If the output should be normalized, then a normalization procedure may be applied by post-processing element 418 (FIG. 4).

In one implementation, the input format field 514 may indicate whether the input pixel data is coming in as, for example, single component sampled, three-component sampled, or four-component sub-sampled format. The invention is not limited in this regard however, and other input pixel data formats may be supported consistent with the invention as disclosed herein. In addition, the input mode field 516 may indicate whether the input pixel data is coming in single column fashion or multiple-column fashion (e.g., two-column, four-column, etc.). Once again, however, the invention is not limited with regard to input pixel data modes and/or formats.

The CSM field 502 may indicate the coefficient switching method to be used in implementing a programmable tap filter architecture for image processing (e.g., PE 400, FIG. 4). In one implementation, CSM field 502 may apply to 2-D non-separable filters as will be discussed in greater detail below. For example, CSM field (i.e., data bit(s)) 502 may be reset (i.e., configured to have binary "0" (zero) value) to indicate that the coefficient set used for filtering may be determined dynamically by the DSM bit(s) 522 (e.g., the most significant bit(s) of the input pixel component value) of input data 518. In one implementation, a CSM 502 value of 0 and a DSM 522 value of 0 may indicate that an asymmetric coefficient set is to be used for 2-D non-separable filtering of the associated pixel data 520. In another implementation, a CSM 502 value of 0 and a DSM 522 value of 1 may indicate that a quadrant-symmetric coefficient set is to be used for filtering that pixel data 520. These and other implementations will be described in more detail below with respect to FIGS. 6, 7 and 8.

In one implementation, the CSM field 502 may be set (i.e., configured to have binary "1" (one) value) to indicate that the coefficient set used for filtering may be determined by the SSM field (or bit(s)) 504 of mode register 406. In one implementation, a CSM 502 value of 1 and a SSM 504 value of 0 may indicate that an asymmetric coefficient set is to be used for 2-D non-separable filtering of pixel data 518. In another implementation, a CSM 502 value of 1 and a SSM 504 value of 1 may indicate that a quadrant-symmetric coefficient set is to be used for 2-D non-separable filtering of the pixel data 520. These and other implementations will be described in more detail below with respect to FIGS. 6, 7 and 8.

The invention is not limited to particular combinations of CSM 502 and/or SSM 504 and/or DSM 522 values, and those skilled in the art will recognize that other combinations of CSM 502 and/or SSM 504 and/or DSM 522 values may be utilized consistent with the inventive subject matter. For example, a CSM 502 value of 0 and a DSM 522 value of 1 may indicate that an asymmetric coefficient set is to be used for 2-D non-separable filtering of associated pixel input data, while, in another implementation, a CSM 502 value of 0 and a DSM 522 value of 0 may indicate that an asymmetric coefficient set is to be used for the 2-D non-separable filtering. Clearly, by configuring the CSM 502 and/or SSM 504 control fields in mode register 406 in addition to the DSM 522 portion of input data 518, numerous implementations of non-separable filter element 416 are possible, consistent with the claimed invention.

In one implementation, BLND field 505 may be configured to indicate that blending of the tap outputs of separable stage II filters 414A and 414B is to be performed. In particular, in one implementation, BLND field 505 may apply to 2-D separable filters as will be discussed in greater detail below. In one implementation, although the invention is not limited in this regard, BLND field 505 may be set to indicate to post processing element 418 that tap outputs Tap A and Tap B are to be blended together as at least part of the post-processing implemented to generate the filtered image data. Alternatively, BLND field 505 may be set to indicate to post processing element 418 that either of tap outputs Tap A or Tap B are to be post-processed to generate the filtered image data.

LFM field 507 and/or HFM field 509 may be configured to indicate the type of filter (e.g., F3, F7, F9, F11 etc.) to be implemented by respective separable stage II filters 414A and 414B. In one implementation, although the invention is not limited in this regard, LFM field 507 and/or HFM field 509 may be 3-bits wide permitting six distinct filter settings for each of separable stage II filters 414A and 414B. For example, configuring HFM field 509 as (0,0,1) may indicate that separable stage II filter 414B is to perform F3 filtering of the image data, while configuring LFM field 507 as (1,0,1) may indicate that separable stage II filter 414A is to perform F11 filtering of the image data. Although the invention is not limited in this regard, LFM field 507 and/or HFM field 509 may be configured to indicate that no image filtering is to be performed by the respective separable stage. Clearly, by configuring the LFM field 507 and/or HFM field 509 control fields in mode register 406, numerous implementations of separable stage II filters 414A and 414B are possible, consistent with the claimed invention.

Although specific mode register fields are listed, above, it is to be understood that mode register 406 may include more, fewer or different fields, in other implementations. For example, mode register 406 may include a field to indicate the swath height, the normalization value (i.e., the value used to multiply the filtered output if normalization is enabled), the shift value (i.e., the number of bits to right shift the filtered output), and/or other filter-related information. In addition, some and/or all of the data/control fields discussed above in conjunction with mode register 406 may be stored elsewhere or depicted in other manners.

Figure 6:
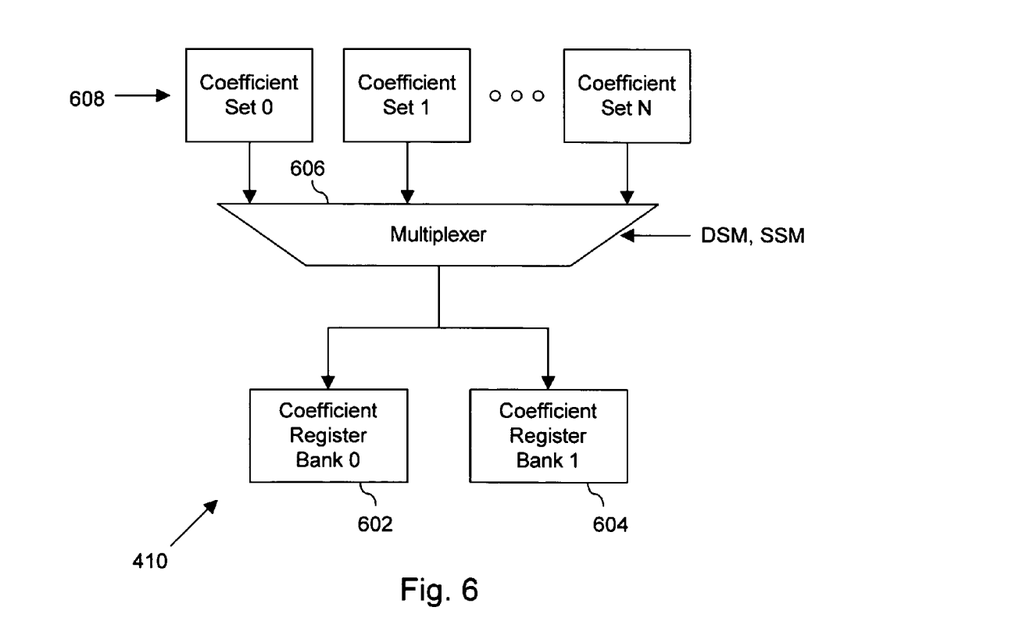
FIG. 6 illustrates the coefficient source of FIG. 4 in more detail.

FIG. 6 is a simplified block diagram illustrating coefficient source 410 in more detail in accordance with the invention. Source 410 may include a first coefficient register bank ("bank 0") 602, a second coefficient register bank ("bank 1") 604, and a multiplexer 606. Register banks 602 and 604 may comprise any mechanism capable of storing and/or holding sets of coefficient values 608 suitable for filtering image data. For example, bank 602 and/or bank 604 may comprise special purpose and/or general purpose registers. Moreover, while FIG. 6 illustrates two register banks, the invention is not limited in this regard, and those skilled in the art will recognize that source 410 may include one, three or another number of register banks.

Multiplexer 606 may comprise any mechanism capable of selecting between a plurality of coefficient sets 608 in response to the value(s) of the DSM field 522 of input data 518 and/or in response to the value(s) of the SSM field 504 stored and/or held in mode register 406. In response to DSM and/or SSM values, multiplexer 606 may provide one or more of coefficient sets 608 to register banks 602 and/or 604. For example, in response to a DSM 522 value of zero, multiplexer 606 may provide coefficient set 0 to register bank 0 and/or coefficient set 1 to register bank 1, or visa-versa. Clearly, many combinations of values for DSM 522 and/or SSM 504 may instruct multiplexer 606 to provide different combinations of coefficient sets 608 to one or both of banks 602, 604 consistent with the claimed invention.

Figure 7:
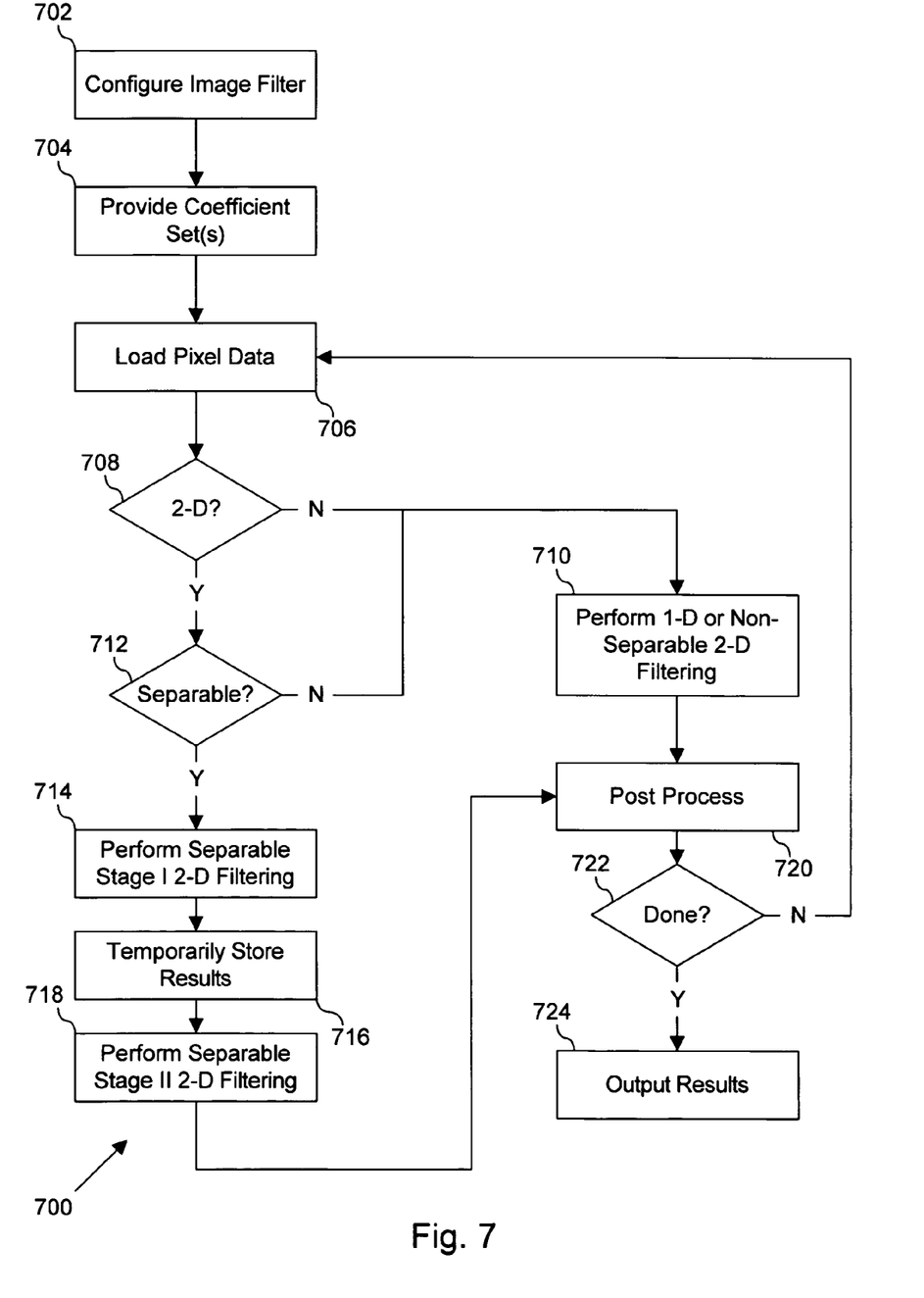
FIG. 7 is a flow chart illustrating an example process of filtering image data.

FIG. 7 is a flow chart illustrating a process 700 for providing a multi-feature programmable tap filter in accordance with the invention. While, for ease of explanation, process 700, and associated processes, may be described with regard to system 100 of FIG. 1 and components of system 100 as illustrated in FIGS. 4, 5 and 6, the claimed invention is not limited in this regard.

Process 700 may begin with the configuring of the image filter (e.g., filter 400, FIG. 4) to perform a selected filtering operation of a set of pixel input values [act 702]. In one implementation, configuring the image filter may include selecting a filtering operation from a group of operations that may include a 1-D filtering operation and one or more 2-D filtering operations. In one implementation, filter 400 may be configured for either 1-D or 2-D filtering operations by setting and/or resetting the 1D__2D field 510 of mode register 406. Moreover, 2-D filtering operations that may be selected from include a separable 2-D filtering operation and a non-separable 2-D filtering operation. In one implementation, filter for either separable or non-separable 2-D filtering operations by setting and/or resetting the S_NS field 508 of mode register 406.

In one implementation, if S_NS field 508 indicates that filter 400 is to perform separable filtering then image data in the form of input data 518 stored within memory 402 may be sent to stage I filter element 408. In one implementation, address generator 404 may be used to ensure that the image data is sent to stage I filter element 408 in an appropriate order, when stage I filter element 408 is ready to accept the data.

Configuring filter 400 for 2-D filtering may include, in one implementation, specifying the filters implemented by separable stage II filters 414A and/or 414B (e.g., F3, F7,F9, F11 etc.) by configuring LFM field 507 and/or HFM field 509 in mode register 406. In another implementation, the filter implemented by non-separable filter 416 (e.g., F3, F7, F9, F11etc.) may be specified by configuring LFM field 507 in mode register 406.

In addition to the filter type, the size of the coefficient matrix (e.g., F3, F5, F7, etc.) also can be configured, as well as the type of input data, and other parameters. The configuration information can be loaded into a mode register (e.g., register 406, FIG. 4) using a command from a host processor (e.g., processor 112, FIG. 1) or other command source.

Process 700 may continue with the provision of horizontal dimension and/or vertical dimension coefficient set(s) [act 704]. These coefficient matrices and/or sets may be made available to the filtering stage(s) of FIG. 4. Act 704 may be accomplished by having one or more sets of coefficients loaded into coefficient source 410 of FIG. 5.

Process 700 may continue with the loading of pixel input data is loaded into memory [act 706] (e.g., memory 402, FIG. 4, accessible to the separable stage I filter 408 and/or the non-separable filter 416). In one implementation, input data 518 including coefficient selection data and/or data bits (e.g., DSM data 522, FIG. 5A) as discussed above may be loaded in act 704.

Process 700 may continue with a determination of whether a 2-D filtering operation is to take place [act 708]. In one implementation, act 708 may take place once sufficient image pixel data is available for filtering. In one implementation, whether a 2-D filtering operation is to take place may be indicated by setting and/or resetting the 1D__2D field 510 of mode register 406 (FIG. 4). If a 2-D filtering operation is not chosen (i.e., a 1-D filtering operation is chosen), then a non-separable filtering operation may be performed [act 710]. One way to do this is to filter the image pixel data using non-separable filter element 416 of FIG. 4. In one implementation, LFM field 507 may indicate the 1-D filtering performed (e.g., F3, F5, F7 or F11) in act 710.

If a 2-D filtering operation is chosen, then a determination may be made regarding whether the 2-D filtering operation is to be performed in a separable manner [act 712]. In one implementation, separable 2-D filtering operation may be indicated by setting and/or resetting the S_NS field 508 of mode register 406 (FIG. 4). If a 2-D separable filtering operation is not chosen (i.e., a 2-D non-separable filtering operation is chosen), then a non-separable filtering operation may be performed [act 710]. As mentioned above, one way to do this is to filter the image pixel data using non-separable filter element 416 of FIG. 4. In one implementation, if the operation chosen is a non-separable operation, then the intermediate filtered image data (i.e., the data resulting from stage I filtering) may be added together, as each value may constitute a row-sum of coefficient/pixel value products. As discussed above, the 2-D non-separable filtering performed (e.g., F3, F5, F7 or F11), may be indicated by setting and/or resetting the LFM field 507 in mode register 406.

If a 2-D separable filtering operation is chosen then a separable stage I filtering operation may be performed [act 714]. In one implementation, this may be accomplished by filtering pixel data 520 in a first dimension using separable stage I filter element 408. In one implementation, the first dimension is the horizontal dimension and stage I filtering may involve multiplying a sub-block of pixel values by horizontal dimension coefficients. In another implementation, the first dimension is the vertical dimension. In one implementation, the stage I filtering of separable 2-D filtering operation may be accomplished using horizontal coefficients of an asymmetric coefficient set stored and/or held in coefficient source 410, as will be described in more detail below. In one implementation, stage I filter element 408 performs F3, F5, F7 and F11 filtering in the first dimension generating F3, F5, F7 and F11 partially filtered pixel data (i.e., pixel data F3, F5, F7 and F11 filtered in the first dimension).

Process 700 may continue with the temporary storage [act 716] of the one or more (e.g., F3, F5, F7 and F11) first filter output and/or tap values produced by the stage I filtering operation in act 714. This may be accomplished by temporarily storing the stage I results in storage element 412, FIG. 4. The invention is not limited in this regard, however, and those of skill in the art will recognize that intermediate results of the stage I filtering may not be temporarily stored but, rather, may be made immediately available for further processing.

Process 700 may continue with the performance of separable stage II filtering [act 718]. One way to do this is to provide the intermediate filtered image data (i.e., the data resulting from stage I filtering), stored temporarily in act 716 in storage element 412, to both separable stage II filter elements 414A and 414B and to have filter elements 414A and 414B filter this intermediate data in a second dimension that is orthogonal to the first dimension. In one implementation, the 2-d separable stage II filtering may involve multiplying the stage I filter output values by vertical dimension coefficients. In one implementation, the second dimension is the horizontal dimension.

Process 700 may continue with the post-processing [act 720] of the output of the 2-D separable stage II filtering process (act 718) and/or the output of the non-separable (1-D and/or the 2-D) processing (act 710). This may be accomplished by having the output of non-separable filter element 416, the output of the separable stage I filter element 408, and/or the output of the separable stage II filter elements 414A and 414B processed by post-processing element 418 to yield filtered image data. As described previously, post-processing may include normalization, shifting, and/or rounding. Post-processing operations may also include the blending and/or combining of the respective Tap A and Tap B filtered image data outputs of separable stage II filters 414A and 414B. As discussed above, post-process blending of Tap A and Tap B may be indicated by setting and/or resetting the BLND field 505 of mode register 406.

In one implementation, stage II filters 414A and 414B output filtered pixel data of different dimensionality at respective taps A and B. For example, in response to the LFM 507 and/or HFM 509 fields of mode register 406, stage II filters 414A and 414B may output adjacent taps, such as F3 and F5 or F9 and F11, at respective taps A and B. In another implementation, stage II filters 414A and 414B may, in response to the LFM 507 and/or HFM 509 fields, output non-adjacent taps, such as F3 and F7 or F3 and F11, at respective taps A and B.

Post-processing in act 720 may then include the blending and/or combining, in response to BLND field 505 of mode register 406, taps A and B to generate, for example, filtered image data corresponding to F4 tap filtered data from adjacent F3 and F5 tap outputs, or, for example, F5 tap filtered data from non-adjacent F3 and F7 tap outputs. Of course, the above implementations cover only a few examples and many other combinations of stage II filtering and subsequent post-processing will be consistent with the claimed invention.

In addition, other processing variations could be envisioned by those of skill in the art, based on the description herein. For example, the configuration of the image filter in act 702 may be undertaken once or may be undertaken anew in response to the loading of distinct portions of pixel data in act 704, as will be described in greater detail below.

Process 700 may continue with a determination of whether all pixels have been processed [act 722]. In one implementation, host processor 112 (FIG. 1) may make this determination and inform filter 400 (FIG. 4) within image processor 102 (FIG. 1) as to whether all pixels have been processed of a particular image have been processed. If all pixels have not been processed, then a next sub-block of image pixel data may be selected for filtering (in, for example, the same or a different swath of image pixels), and the process iterates as shown. If all pixels to be processed have been processed, then the results of the post-processing procedure may be output [act 724].

Figure 9A:
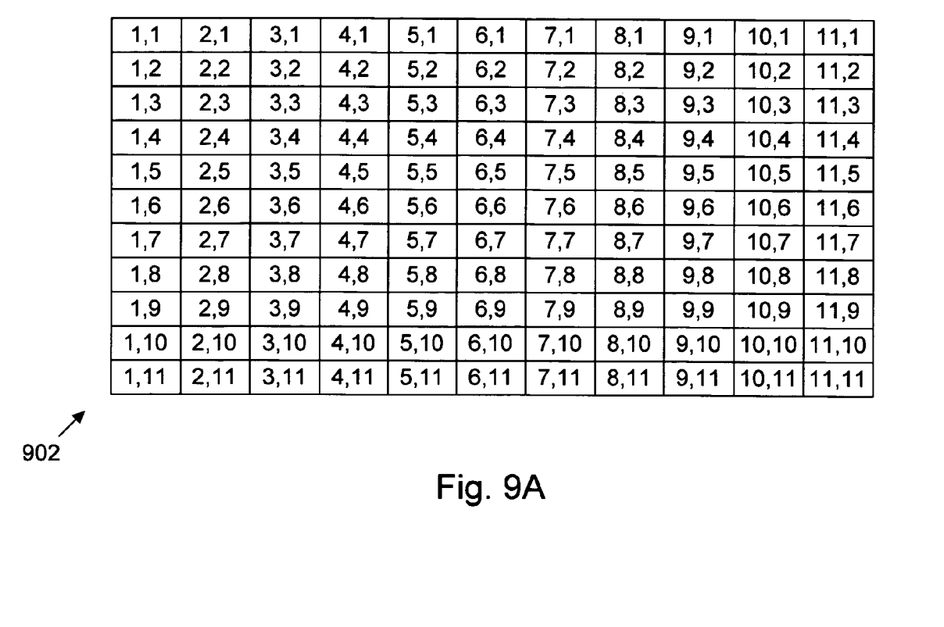
Figure 9B:
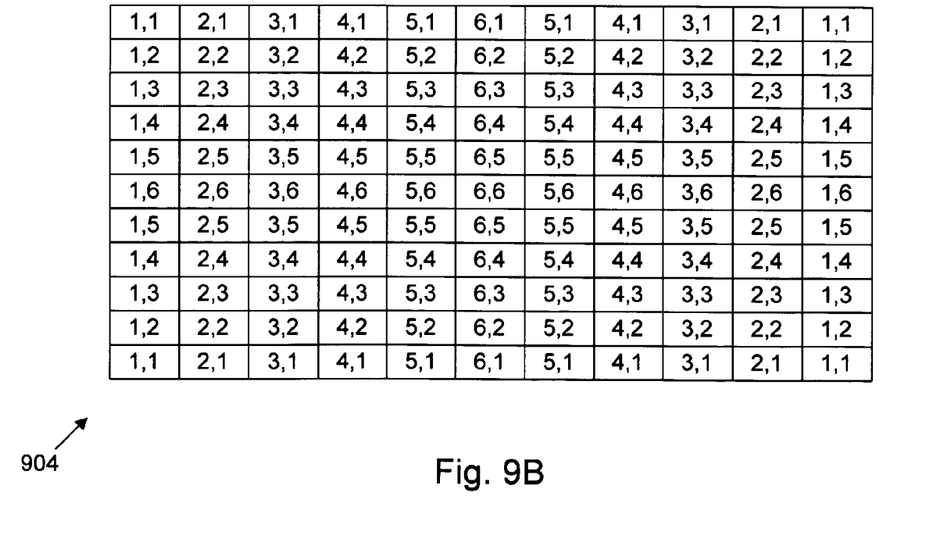

Portions of process 700 will now be described in further detail with respect to an example 2-D non-separable filtering operation employing an F11 filter. With respect to this example, FIG. 9A illustrates an example sampled, asymmetric coefficient set 902 (e.g., one of coefficient sets 608 of FIG. 6) comprising eleven rows and eleven columns of coefficients with each coefficient labeled by column number and row number pairs (e.g., the coefficient in column eleven, row eleven is labeled (11,11)). FIG. 9B illustrates an example sampled, quadrant symmetric coefficient set 904 (e.g., another of coefficient sets 608 of FIG. 6) comprising four symmetric quadrants of six rows and six columns of coefficients.

Referring to FIGS. 4-7 and 9, a 2-D, a non-separable F11 filtering operation using process 700 may begin with the configuring of image filter 400 [act 702] by the setting and/or resetting of the CSM field 502 in mode register 406. In one implementation, if the CSM field 502 is reset to "0" then the coefficient sets provided in act 706 may be selected dynamically in response to the DSM field 522 of the pixel data loaded in act 704. If the CSM field 502 is set to "1" then the coefficient sets provided in act 706 may be selected in response to value of the SSM field 504 of mode register 406.

Figure 8A:
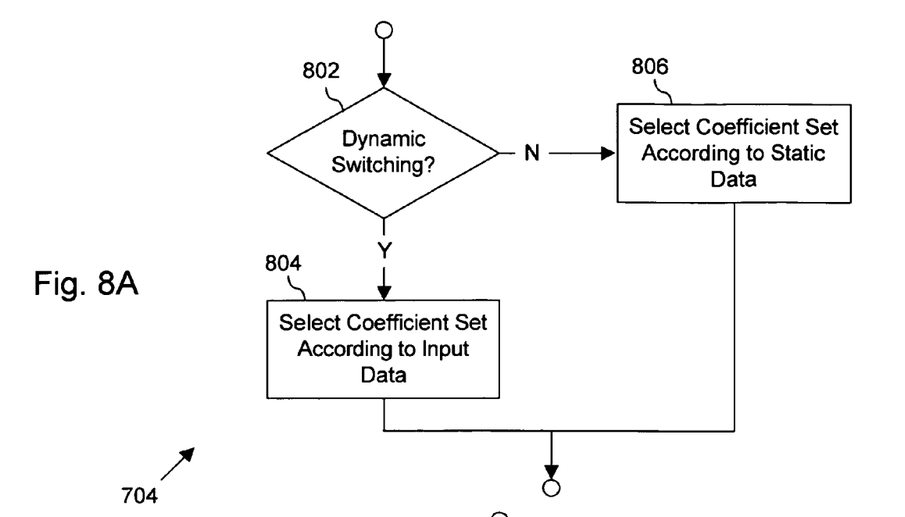
FIG. 8 is a flow chart illustrating a portion of the process of FIG. 7 in greater detail.

FIG. 8A illustrates act 704 of process 700 in more detail. Act 704 may begin with a determination of whether dynamic switching of coefficient sets has been enabled [act 802]. If dynamic switching is enabled then coefficient set(s) may be selected according to or in response to the input data [act 804]. In one implementation, dynamic switching may be enabled and/or indicated by the resetting of CSM field 502 to "0" in which case the coefficient sets may be selected in response to and/or according to the DSM field 522 of input data 518. If dynamic switching is not enabled then coefficient set(s) may be selected according to or in response to static data [act 806]. In one implementation, dynamic switching may be contra-indicated by the setting of CSM field to "1" in which case the coefficient sets may be selected in response to and/or according to static data indicated by the mode register's SSM field 504.

In one implementation, if 2-D non-separable filtering is implemented and dynamic switching is enabled (e.g., CSM field 502 is reset to "0" and DSM field 522 is reset to "0" for a given pixel) then pixel data 520 may be filtered using coefficients from the first row of the coefficients from asymmetric coefficient set 902 of FIG. 9A to filter the data in the horizontal dimension during stage I filtering. Then, in one implementation, pixel data 520 may be filtered in the vertical dimension during stage II filtering using coefficients from the second row of set 902 for LFM mode and/or using coefficients from the third row of set 902 for HFM mode. Otherwise, if the DSM field 522 is set for a given pixel (i.e., has value "1") then that pixel may be filtered using the quadrant symmetric coefficient set of FIG. 9B. In this implementation, the DSM values for each pixel may instruct multiplexer 606 (FIG. 6) to load one of sets 608 into either of coefficient register banks 602 and/or 604.

In one implementation, if dynamic switching is disabled (i.e., CSM field 502 is set to "1") and if the SSM field 504 is reset to "0" for a given pixel then that pixel may be filtered using the asymmetric coefficient set of FIG. 9A. Otherwise, if the SSM field 504 is set to "1" for a given pixel then that pixel may be filtered using the quadrant symmetric coefficient set of FIG. 9B. In this implementation, the SSM value stored in mode register 604 may instruct multiplexer 606 (FIG. 6) to load one of sets 608 into either of coefficient register banks 602 and/or 604. The invention is, however, not limited to this mode of operation, and other modes may be implemented consistent with the claimed invention. For example, the logical definition of the CSM and/or SSM fields may be different (e.g., dynamic switching may be enabled by setting CSM field 502 to "1") without departing from the scope and spirit of the invention.

Figure 8B:
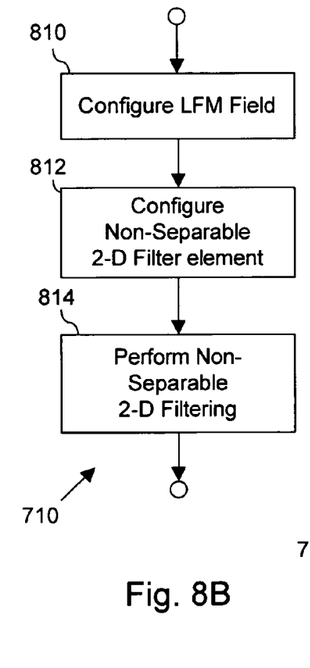

FIG. 8B illustrates act 710 of process 700 in more detail. Act 710 may begin with the configuring of LFM field 507 [act 810]. For example, host processor 112 may configure and/or set and/or reset LFM field 507 in mode register 406 to indicate that a 2-D non-separable filter of a particular dimension (e.g., F3, F5, F7 or F11) be implemented by filter element 416. In response to the value of LFM field 507, non-separable filter element 416 may be configured [act 812]. For example, as discussed above, depending on the value of LFM field 507, element 416 may be configured to perform F3, F5, F7, F9 and/or F11 non-separable 2-D filtering and/or configured to do no filtering. Act 710 may conclude with the performance of the indicated non-separable 2-D filtering [act 814].

Figure 8C:
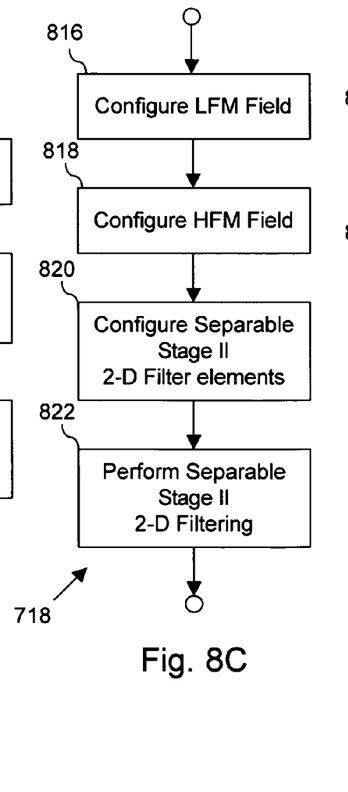

FIG. 8C illustrates act 718 of process 700 in more detail. Act 718 may begin with the configuring of LFM field 507 [act 816]. For example, host processor 112 may configure and/or set and/or reset LFM field 507 in mode register 406 to indicate that a 2-D separable filter of a particular dimension (e.g., F3, F5, F7 or F11) be implemented by filter element 414A. Act 718 may continue with the configuring of HFM field 509 [act 818]. For example, host processor 112 may configure and/or set and/or reset HFM field 509 in mode register 406 to indicate that a 2-D separable filter of a particular dimension (e.g., F3, F5, F7 or F11) be implemented by filter element 414B.

Although FIG. 8C illustrates act 816 as preceding act 818, those of skill in the art will recognize that act 818 may preceed act 816 and/or may be undertaken in conjunction with act 816 in accordance with the claimed invention. In response to the value of LFM field 507 and HFM field 509, separable stage II filter elements 414A and/or 414B may be configured [act 820]. For example, as discussed above, depending on the value of LFM field 507 and HFM field 509, elements 414A and 414B may be independently configured to perform F3, F5, F7, F9 and/or F11 non-separable 2-D filtering and/or configured to do no filtering. Act 718 may conclude with the performance of the indicated 2-D separable stage II filtering [act 822].

Figure 8D:
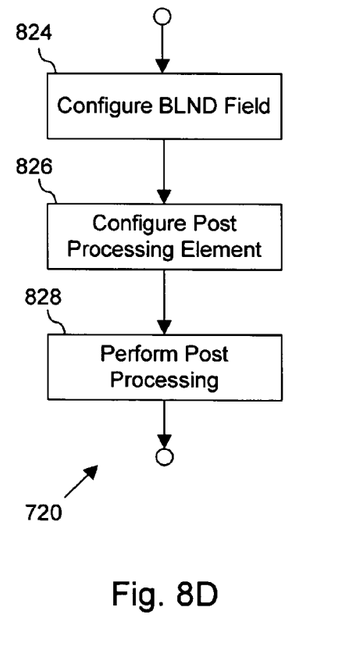

FIG. 8D illustrates act 720 of process 700 in more detail. Act 720 may begin with the configuring of BLND field 505 [act 824]. For example, host processor 112 may configure and/or set and/or reset BLND field 505 in mode register 406 to indicate whether filtered outputs Tap A and Tap B should be blended by post-processing element 418. In response to the value of BLND field 505, post-processing element 418 may be configured [act 826]. For example, as discussed above, depending on the value of BLND field 507, element 418 may be configured to blend the Tap A and Tap B filtered tap outputs or respective separable stage II filter elements 414A and 414B. Act 720 may conclude with the performance of the indicated post-processing [act 828].

The acts shown in FIG. 7 and/or FIG. 8A-D need not be implemented in the order shown; nor do all of the acts necessarily need to be performed. For example, in the case of dynamic coefficient switching the configuring of the coefficient filter in act 704 may take place dynamically and may occur after the loading of pixel data in act 702. Likewise, the HFM field may be configured in act 818 before, during, or after the configuring of the LFM field in act 816. Also, those acts that are not dependent on other acts may be performed in parallel with the other acts. Further, at least some of the acts in this figure may be implemented as instructions, or groups of instructions, implemented in a machine-readable medium.

The foregoing description of one or more implementations consistent with the principles of the invention provides illustration and description, but is not intended to be exhaustive or to limit the scope of the invention to the precise form disclosed. Modifications and variations are possible in light of the above teachings or may be acquired from practice of various implementations of the invention. For example, the system, apparatus and methods for multi-feature programmable tap filter image processing is not limited to systems or apparatus providing tap filtering utilizing sampled asymmetric and/or quadrant symmetric coefficient sets. Rather, the claimed invention also contemplates tap filtering using sub-sampled asymmetric and/or quadrant symmetric coefficient sets. Moreover, while FIGS. 7 and 8 and the accompanying text may describe a process for sequential tap filtering of portions of image data, other processes are contemplated by the claimed invention. For example, in one implementation, two or more portions of image data may tap filtered at a time utilizing two ore more suitably configured PEs of image processor 102. Clearly, many other implementations may be employed to provide multi-feature programmable tap filter image processing consistent with the claimed invention.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A method comprising:
providing a register to store information to enable the selection of at least two different configurations for a programmable tap filter; and
using said register to configure said filter to one of a one dimensional mode or a two dimensional mode.

2. The method of claim 1, further comprising:
selectively outputting filtered image data, wherein the filtered image data may be selectively outputted as adjacent tap filter output data or non-adjacent tap filter output data.

3. The method of claim 2, further comprising:
blending either the adjacent tap filter output data or the non-adjacent tap filter output data to generate blended tap filter output data.

4. A device comprising:
a programmable filter; and
a register coupled to said filter, said register to store information used to configure said filter in one of at least two different modes, at least one of said modes being a one dimensional filter mode and the other of said modes being a two dimensional filter mode.

5. The device of claim 4, said register to change the type of input data that the filter accepts.

6. The device of claim 4, said register to enable selection between separable and non-separable modes.

7. The device of claim 4, said register to enable the selection of different filter output formats.

8. The device of claim 7, said register to enable selection between normalized and non-normalized output data 9. The device of claim 4, said register to enable selection of a coefficient switching mode.

10. The method of claim 1, including using said register to enable said filter to be reconfigured to change the type of input data that the filter accepts.

11. The method of claim 1, including enabling the filter to switch between separable and non-separable modes in response to the selection of bits in said register.

12. The method of claim 1, including enabling said filter to change the filter output format based on the selection of bits in said register.

13. The method of claim 1, including enabling said filter to switch between normalized and non-normalized output data based on the selection of bits in said register.

14. The method of claim 1, including enabling the filter to switch to and from a coefficient switching mode based on a selection of bits in said register.

* * * * *